United States Patent
Rodgers

[15] 3,696,732
[45] Oct. 10, 1972

[54] MOTOR VEHICLE WITH AIR FLOW DEFLECTOR

[72] Inventor: John J. Rodgers, South Euclid, Ohio
[73] Assignee: White Motor Corporation, Cleveland, Ohio
[22] Filed: Dec. 29, 1969
[21] Appl. No.: 888,621

[52] U.S. Cl. ............................98/2.14, 296/91
[51] Int. Cl. ..................................B60h 1/24
[58] Field of Search............98/2 R, 2 Q, 2 RS, 2.7, 8, 98/13, 14, 19, 2.14, 2.15; 296/91, 94, 1 S

[56] References Cited

UNITED STATES PATENTS

| | | |
|---|---|---|
| 3,059,562 | 10/1962 | Sturtevant..................98/2.14 |
| 3,090,645 | 5/1963 | Shumaker..................296/91 |
| 1,861,333 | 5/1932 | Zuhlke........................98/2 |
| 2,087,651 | 7/1937 | Mygland....................98/2.7 |
| 2,151,097 | 3/1939 | Germonprez............98/2 RS |
| 2,294,363 | 9/1942 | Brockway..................98/2.7 |

Primary Examiner—Meyer Perlin
Attorney—Watts, Hoffmann, Fisher & Heinke

[57] ABSTRACT

A truck cab has a ram air scoop structure extending across its top to receive air moving upwardly along the front of the cab and direct it downwardly alongside the cab windows so as to minimize turbulence adjacent the windows and inhibit the rise of dirt-laden air from the road to the region adjacent the windows and an attendant deposit of dirt and dirty water on the windowpanes as would otherwise occur.

15 Claims, 4 Drawing Figures

INVENTOR.
JOHN J. RODGERS
BY
Watts, Hoffmann, Fisher & Heinke
ATTORNEYS

MOTOR VEHICLE WITH AIR FLOW DEFLECTOR

BACKGROUND OF THE INVENTION

FIELD OF THE INVENTION

The present invention relates to road vehicles and more particularly to the construction of cabs for highway tractors. Specifically, the invention is directed to a highway tractor roof constructed such that air flow is diverted downwardly along the sides of the vehicle cab.

In the design of modern highway tractors and trucks, the designer attempts to minimize the overall length of the vehicle cab and thus to maximize the permissible overall length of a cargo space in a truck body or trailer. This desire to minimize the length of a highway tractor has been one of the major reasons for the excellent commercial success cab-over-the-engine vehicles have enjoyed.

As cab-over-the-engine designs have evolved, the tendency has been for the cabs to become shorter and shorter and at the same time taller and taller until, in recent designs, they have assumed a rather box-like construction. As the cabs have become shorter and taller, the air-flow characteristics have, at least in some respects, been adversely affected. Notably, modern vehicles are configured such that turbulence occurs along the sides of the vehicle. In inclement weather, particularly when cinders and the like are applied to snow, the lateral vision out of the cab can very quickly be obscured to an unsafe condition. This occurs because water and dirt splashed up from the road tend to become entrained in the turbulent air and then applied to the windows and to exteriorly-mounted rear-view mirrors.

SUMMARY OF THE INVENTION

The present invention inhibits the formation of turbulent air at the sides of the vehicle. It inhibits the formation of turbulent air to the point that not only is the deposit of foreign matter on the windows and mirrors inhibited, under appropriate circumstances, a cleansing action of those windows can actually occur.

With the present invention, an air scoop structure is provided on the roof of the cab. This air scoop structure is either made as an accessory which can be attached to an existing vehicle or integrally formed in the vehicle at the time of manufacture. The air scoop structure has inlet openings across the front and near the top of the vehicle cab. The scoop structure also has diverting vanes which deflect air admitted in the inlets. The air is deflected in a curved path from the front inlets to a discharge downwardly along the sides of the vehicle. This flow of air downwardly along the side of the cab not only inhibits the formulation of a turbulent mass of air adjacent the sides of the cab but also, during a rainstorm, tends to effect a cleansing action of the windows.

Thus, tests have shown that during a rainstorm, water tends to flow downwindow, cleansing dirt from the window. Even in a rainstorm, the visibility through the side windows of the cab remains quite adequate. Under these circumstances, the operator's ability to operate the vehicle safely is enhanced.

Accordingly, the principal object of this invention is to provide a novel and improved motor vehicle equipped with a construction which diverts the relative flow of air of the moving vehicle downwardly along the sides of the vehicle to inhibit the obstruction of visibility through windows of the vehicle.

Other objects and a fuller understanding of the invention may be had by referring to the following description and claims taken in conjunction with the accompanying drawings.

Figure 1:
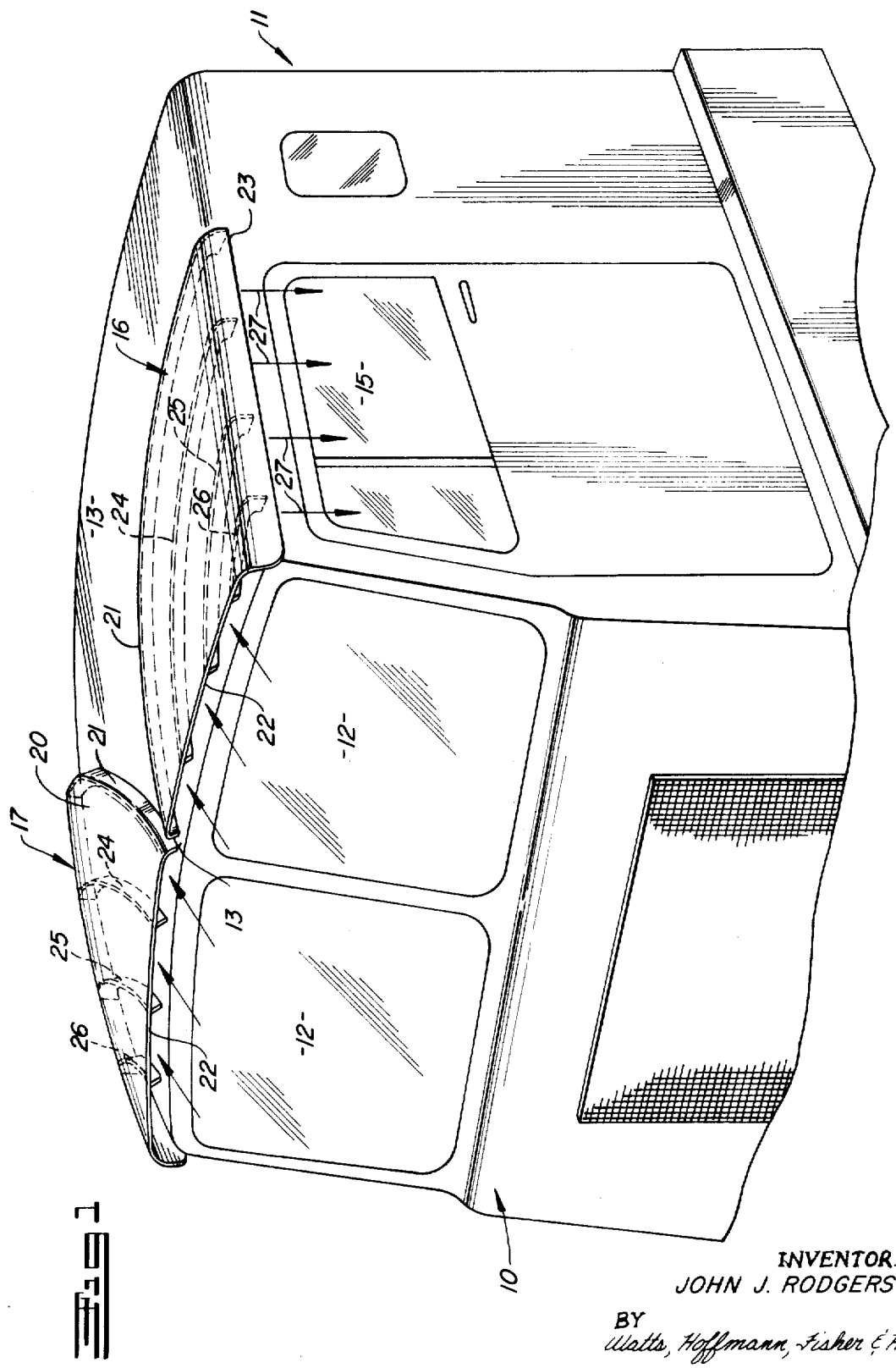
FIG. 1 is a fragmentary perspective view of a truck cab embodying the roof scoop of this invention.

Referring to the drawings, a highway tractor is shown generally at 10. An operator's compartment 11 is provided in the cab 10. The cab 10 includes the usual windshield 12, roof panel 13 and side windows 14, 15.

Figure 2:
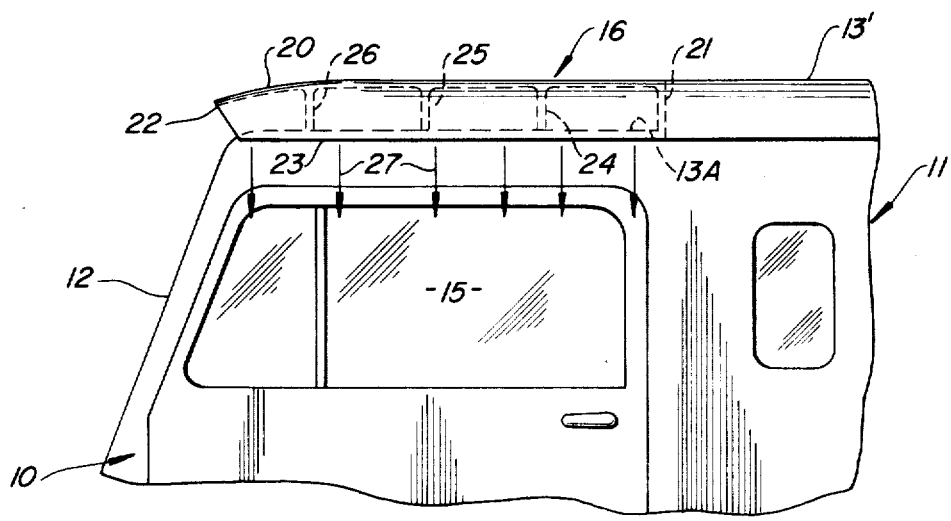
FIG. 2 is a fragmentary side elevational view of a truck cab showing the roof scoop integrally formed.
Figure 3:
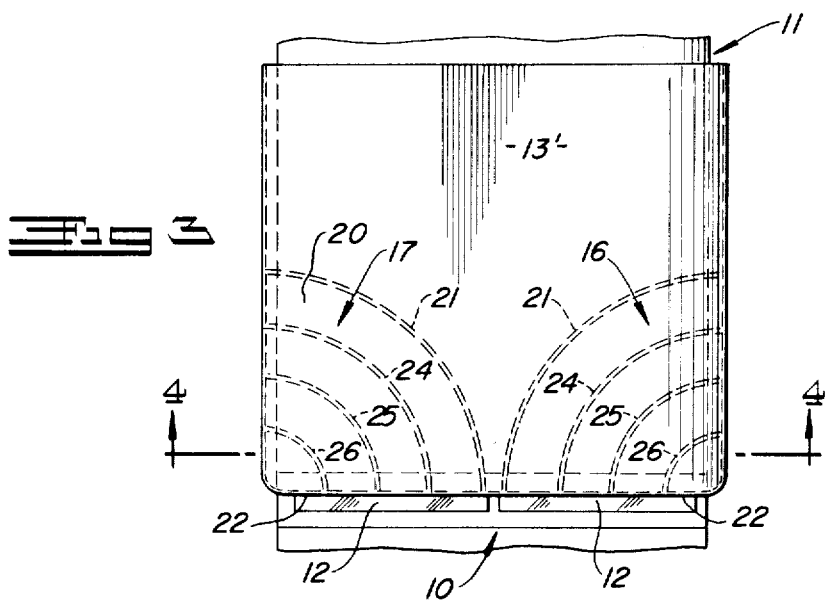
FIG. 3 is a fragmentary top view of the truck of FIG. 2.
Figure 4:
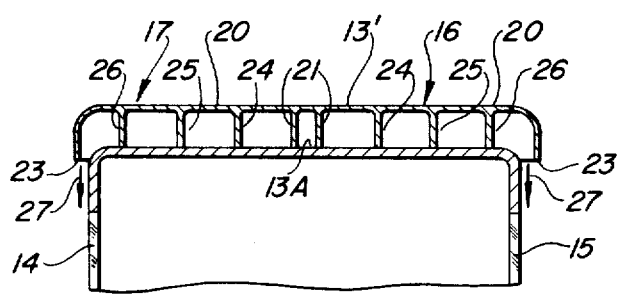
FIG. 4 is a sectional view taken along line 4—4 of FIG. 3.

According to the version of the present invention shown in FIG. 1, a pair of air scoop structures 16, 17 are provided on the roof panel 13 of the cab. In FIG. 1, the air scoops 16, 17 are shown as accessory structures mounted on the roof 13. In the version of FIGS. 2, 3, and 4, the air scoops 16 and 17 are below the roof panel 13' and above a sub roof panel 13A. In short, the scoops 16, 17 of FIGS. 2–4 are integrally formed.

The scoop structures 16, 17 are arranged to direct a substantial volume of air at relatively high velocity downwardly along the outer surfaces of the windows 14, 15 as the truck moves forwardly. The scoop structures 16, 17 are of identical construction and each comprises a top hood member 20 which is generally in the shape of a quadrant of a circle. The curved side of the hood member 20 has a down-turned edge portion forming a wall 21, the lower edge of which is suitably joined with the top or roof 13 of the cab in FIG. 1 and the sub roof 13A in the other Figures. The front edge 22 of the hood 20 extends forwardly over the upper edge of the windshield 12 of the cab and is curved downwardly to form a scoop for collecting air moving upwardly over the front of the truck. This air is directed into the space between the roof panel 13 and the underside of the hood member 20 in the FIG. 1 version. In the version of FIGS. 2–4, it is directed between the hood member 20 and the sub roof 13A.

The side edges 23 of the two hood members 20 extend beyond opposite sides of the cab and are curved downwardly to direct air downwardly and along the outer surfaces of the cab windows therebeneath. Air entering the forward openings of the air scoops 16, 17 is more or less evenly distributed across the cab windows by vertically extending curved vane members or partitions 24, 25, 26. The opposite edges of the vane members 24, 25, 26 are secured to the roof 13, or sub roof 13A, of the cab and to the underside of the hood member 20. The leading edges of the vane members 24, 25, 26 extend to the edges 22 of the hood members 20 and the trailing edges terminate just short of the edges 23 of the hood members. By this construction, air entering each scoop structure 16, 17 is distributed in four streams downwardly across the surfaces of the windows 14, 15 as is indicated by the arrows 27.

It will be apparent that as the tractor truck is driven forwardly, air is rammed into the hood structures 16, 17. This air is diverted and directed under relatively heavy pressure and velocity downwardly into the areas immediately adjacent the windows 14, 15. This supply of air inhibits the tendency of low pressure and turbulent volumes of air to form adjacent the windows. The absence of this reduced pressure and turbulence inhibits the flow of currents of air from the ground or road and attendant dirt and water. Thus, dirt and dirty water wafted from the road by the turbulence created by the truck are not deposited on the windowpanes.

In rainy weather the drops of water entering the hood structures are normally relatively free of dirt and move down over the window surfaces in drop form. Tests indicate rain water not only does not adversely affect the vision of the operator but also when diverted downwardly along the windows, tends to have a cleansing action.

Although the invention has been described in its preferred forms with a certain degree of particularity, it is understood that the present disclosure of the preferred forms has been made only by way of example and that numerous changes in the details of construction and the arrangement of parts may be resorted to without departing from the spirit and the scope of the invention as hereinafter claimed.

What is claimed is:

1. In an over-the-highway vehicle including a cab having a roof, front wall and two side windows, the improved roof structure comprising:
   a. a roof panel;
   b. two roof scoop means each secured to the panel and including structure defining a forwardly oriented inlet opening and an outlet opening oriented downwardly toward a space adjacent a respective one of said side windows; and,
   c. said roof scoop means including a deflector vane for deflecting air entering said inlet openings to said outlet openings.

2. In an over-the-highway vehicle including a cab having a roof, front wall and a side window, the improved roof structure comprising:
   a. a roof panel;
   b. a scoop means secured to the panel and including structure defining a forwardly oriented inlet opening and an outlet opening oriented downwardly toward a space near said side window; and,
   c. said roof scoop means including a plurality of arcuately curved vanes for deflecting air entering the inlet to the outlet.

3. The vehicle of claim 2 wherein said roof structure includes panel above and below said deflector whereby the air passage formed by said roof scoop is integral of said roof structure.

4. In a vehicle having a cab structure including at least two sidewindows and a roof, the improvement of a device for improving visibility through the sidewindows comprising air direction means associated with said roof for directing a stream of air from the region of said roof downwardly over a substantial portion of the exterior of said sidewindows, said air direction means including at least one forwardly facing inlet opening for receiving air flowing along the region of said roof, and at least one separate downwardly directed outlet opening being provided substantially adjacent the exterior portion of each of said side windows.

5. The vehicle of claim 4 wherein said air direction means defines separate air flow passages for each of said side windows.

6. In combination with a vehicle including a cab having a roof, a front wall and a side window, deflector means to direct a stream of air downwardly alongside a substantial portion of the exterior surface of the side window to cleanse the side window and to oppose the upward flow of dirt-laden air from the roadway and to thereby minimize the deposit of foreign matter on the side window, said deflector means including means forming an air duct having an air inlet facing the front of the vehicle and an air discharge opening extending along a substantial portion of the upper edge of the side window and having a downwardly extending side for directing air downwardly across the exterior surface of the side window, said means forming said air duct further including a top duct wall having an end portion at said inlet extending forwardly of the front wall of the cab.

7. In combination with a vehicle including a cab having a roof, a front wall and a side window, deflector means to direct a stream of air downwardly alongside a substantial portion of the exterior surface of the side window to cleanse the side window and to oppose the upward flow of dirt-laden air from the roadway and to thereby minimize the deposit of foreign matter on the side window, said deflector means including means forming an air duct having an air inlet facing the front of the vehicle and an air discharge opening extending along a substantial portion of the upper edge of the side window and having a downwardly extending side for directing air downwardly across the exterior surface of the side window, said means forming said duct further including a hood member disposed over the roof of the cab such that said hood member and the roof form top and bottom walls of said duct, said hood extending forwardly and rearwardly of the front wall of the cab.

8. In an over-the-highway vehicle including a cab having a roof, a front wall disposed generally perpendicular to the path of forward movement of the vehicle and at least one side window disposed generally parallel to the path of forward movement of the vehicle, the improved roof structure comprising:
   a. roof panel means carried by the roof of the cab at a position spaced thereabove;
   b. deflector means interposed between said roof panel and the cab roof;
   c. said roof panel means, said deflector means, and the cab roof cooperating to define at least one air passage comprising:
      i. a forwardly facing air inlet opening for receiving air approaching the front wall as the vehicle traverses a path of forward movement;
      ii. a downwardly directed air discharge opening for discharging air downwardly across the side window; and,
      iii. a passage interconnecting said inlet opening and said discharge opening which directs the air flow across the roof of the cab in a smooth arcuate path so as to change its direction from a direction generally paralleling the path of forward movement of the vehicle to a direction which is generally perpendicular to the forward path of movement so as to discharge downwardly through said discharge opening and across the side window.

9. The vehicle of claim 8 wherein said roof panel means, said deflector means, and the cab roof cooperate to define an air flow passage which initially directs the air flowing therethrough along an arcuate path through an arc of approximately 90° across the top of the cab roof, and subsequently deflects the air flow through a second arc so as to turn it downwardly across the side window.

10. In an over-the-highway vehicle including a cab having a front wall disposed generally perpendicular to the path of forward movement of the vehicle and at least one side window disposed generally parallel to the path of forward movement of the vehicle the improvement of a cab roof structure comprising upper and lower spaced apart roof panel means having air deflection means interposed between, said roof panel means and said air deflection means cooperating to define at least one air flow passage comprising:
   a. a forwardly facing air inlet opening for receiving air approaching the front wall as the vehicle traverses a path of forward movement;
   b. a downwardly directed air discharge opening for discharging air downwardly across said side window; and,
   c. deflector means defining a smooth arcuate passage extending from said air inlet opening to said air discharge opening for transmitting air across the roof of the cab and diverting it from a direction generally paralleling the path of forward travel of the vehicle to a direction which is generally perpendicular to the forward path of movement so as to discharge downwardly through said discharge opening and across the side window.

11. The vehicle of claim 10 wherein said air deflection means includes a plurality of curved vanes defining separate spaced airflow passages therebetween which each serve to direct air approaching the front wall through an arcuate path across the top of the cab roof and downwardly across the side window.

12. A method of maximizing vehicle side window visibility in a vehicle including a cab having a front wall disposed generally perpendicular to the path of forward movement of the vehicle, at least one side window disposed generally parallel to the path of forward movement of the vehicle, and a cab roof structure comprising upper and lower spaced apart roof panels with air deflection means interposed therebetween defining a smooth arcuate path for transmitting air from a forwardly facing air inlet opening to a downwardly directed discharge opening, comprising the steps of:
   a. operating the vehicle along a forward path of travel so as to introduce air into the inlet opening;
   b. directing the air between the roof panels in a smooth arcuate path so as to change its direction from a direction generally paralleling the path of forward movement of the vehicle to a direction which is generally perpendicular to the forward path of movement of the vehicle; and,
   c. discharging the air through the discharge opening downwardly across a substantial portion of the exterior side window surface so as to clean the side window and to oppose the upward flow of dirt-laden air from the roadway.

13. The method of claim 12 wherein a plurality of vanes defining separate air flow passages between the roof panels are used to direct the air across the roof of the cab and discharge it downwardly over the side window.

14. The method of claim 12 wherein there are at least two side windows disposed on opposite sides of the cab, and said steps of directing and discharging air comprise directing a first portion of the air introduced between the roof panels for discharge across one of the side windows, and directing a second portion of the air introduced between the roof panels for discharge across the other side window.

15. The method of claim 14 wherein separate deflection means each comprising a plurality of vanes are interposed between the roof panels so as to direct the first and second portions of air across the roof of the cab for discharge across their respective side windows.

* * * * *